United States Patent [19]

Marshall et al.

[11] Patent Number: 5,688,036
[45] Date of Patent: Nov. 18, 1997

[54] HIGH-MOUNTED TRUCK TAIL LIGHTS

[76] Inventors: Belvin F. Marshall; Lucy Marshall, both of 150 Heart Lake Rd., Inglewood, Ontario, Canada, L0N 1K0

[21] Appl. No.: 676,645

[22] Filed: Jul. 11, 1996

[51] Int. Cl.⁶ .................................................. B60Q 1/26
[52] U.S. Cl. ........................... 362/80; 362/61; 362/249; 340/431; 340/475
[58] Field of Search .................... 362/61, 80, 83.3, 362/249, 251; 340/471, 472, 468, 473, 431, 479, 475

[56] References Cited

U.S. PATENT DOCUMENTS

| | | | |
|---|---|---|---|
| 2,853,595 | 9/1958 | Baldwin | 362/80 |
| 2,991,116 | 7/1961 | Andrews | 362/80 |
| 3,112,888 | 12/1963 | McKenzie | 362/226 |
| 3,633,021 | 1/1972 | Rossi | 362/80 |
| 4,903,174 | 2/1990 | Busby | 340/468 |
| 5,073,768 | 12/1991 | Willaredt | 340/468 |
| 5,560,702 | 10/1996 | Gold | 362/80 |

*Primary Examiner*—Thomas M. Sember

[57] ABSTRACT

High-mounted truck tail lights for signalling braking and turning of a truck to drivers located beyond other vehicles positioned immediately behind the truck. The inventive device includes a left signal light and a right signal light mounted to the lateral pillars or rear doors of a truck trailer body. The signal lights are positioned proximal to an upper transverse pillar of the truck trailer body so as to be viewable over a car or other vehicle positioned immediately behind the trailer body to reduce accidents resulting from non-visible highway signals during lane changing procedures or the like.

1 Claim, 3 Drawing Sheets

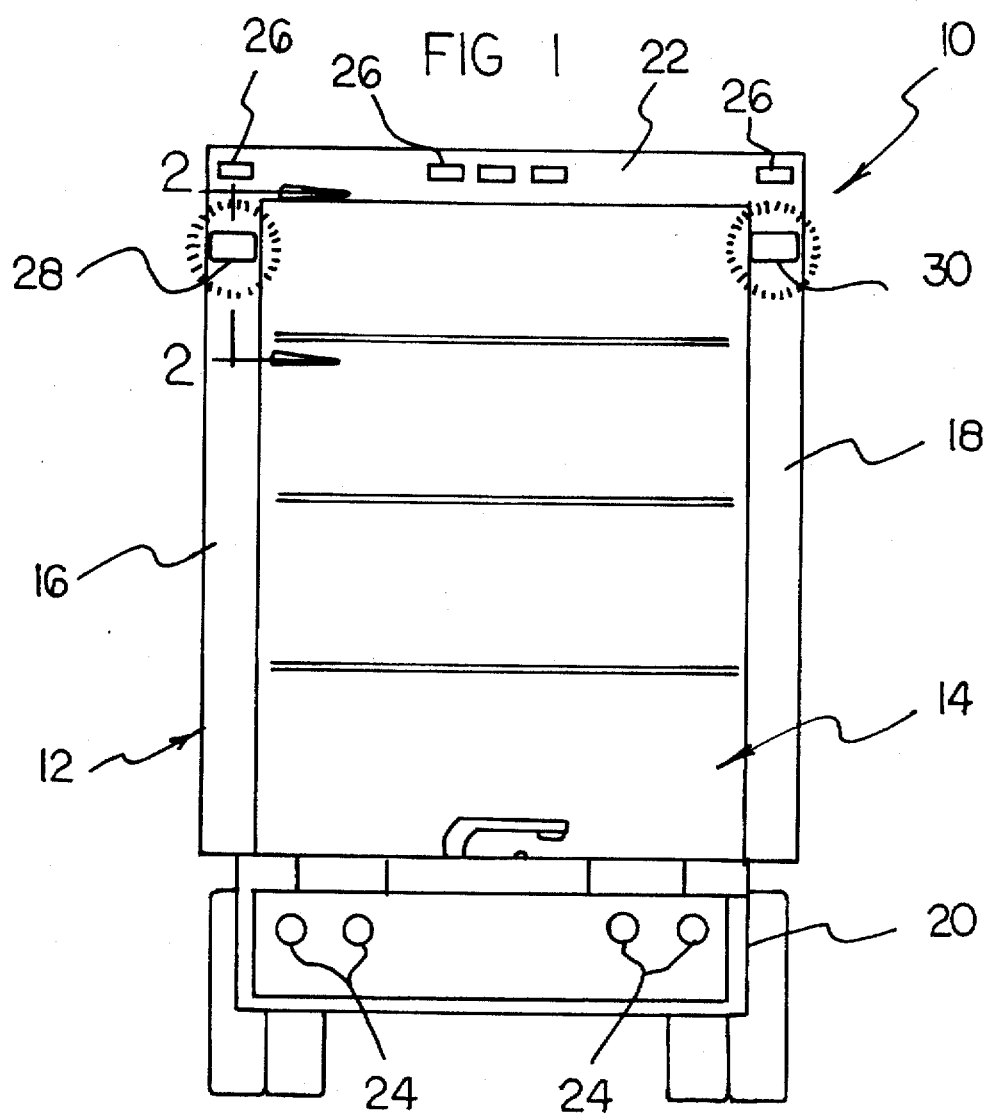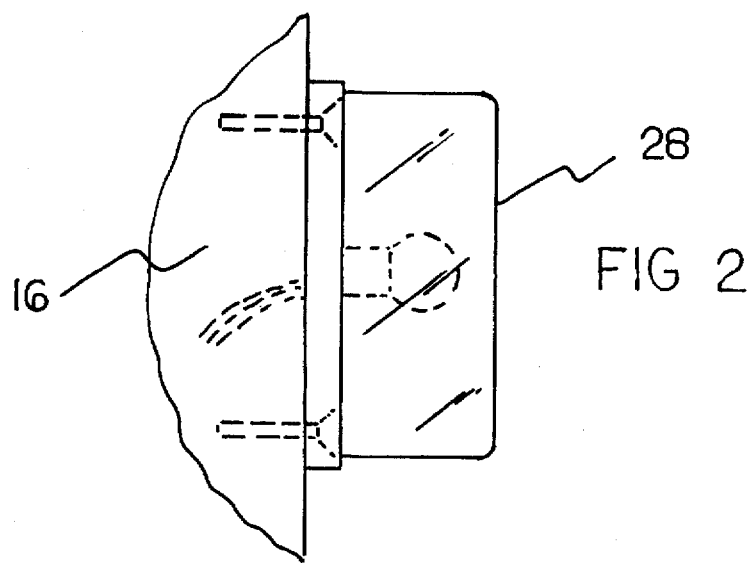

HIGH-MOUNTED TRUCK TAIL LIGHTS

BACKGROUND OF THE INVENTION

1. Field of the Invention

The present invention relates to tail light signaling devices and more particularly pertains to high-mounted truck tail lights for signalling braking and turning of a truck to drivers located beyond other vehicles positioned immediately behind the truck to reduce accidents resulting from non-visible highway signals during lane changing procedures or the like.

2. Description of the Prior Art

The use of tail light signaling devices is known in the prior art. More specifically, tail light signaling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art tail light signaling devices include U.S. Pat. No. 3,588,812; U.S. Pat. No. 4,164,737; U.S. Design Patent 334,074; U.S. Design Patent 320,666; U.S. Design Patent 313,862; and U.S. Design Patent 313,661.

While these devices fulfill their respective, particular objectives and requirements, the aforementioned patents do not disclose high-mounted truck tail lights for signalling braking and turning of a truck to drivers located beyond other vehicles positioned immediately behind the truck which includes a left signal light and a right signal light mounted to the lateral pillars or rear doors of a truck trailer body, with the signal lights being positioned proximal to an upper transverse pillar of the truck trailer body so as to be viewable over a car or other vehicle positioned immediately behind the trailer body to reduce accidents resulting from non-visible highway signals during lane changing procedures or the like.

In these respects, the high-mounted truck tail lights according to the present invention substantially departs from the conventional concepts and designs of the prior art, and in so doing provides an apparatus primarily developed for the purpose of signalling braking and turning of a truck to drivers located beyond other vehicles positioned immediately behind the truck.

SUMMARY OF THE INVENTION

In view of the foregoing disadvantages inherent in the known types of tail light signaling devices now present in the prior art, the present invention provides new high-mounted truck tail lights construction wherein the same can be utilized for signalling braking and turning of a truck to drivers located beyond other vehicles positioned immediately behind the truck. As such, the general purpose of the present invention, which will be described subsequently in greater detail, is to provide new high-mounted truck tail lights apparatus and method which has many of the advantages of the tail light signaling devices mentioned heretofore and many novel features that result in high-mounted truck tail lights which are not anticipated, rendered obvious, suggested, or even implied by any of the prior art tail light signaling devices, either alone or in any combination thereof.

To attain this, the present invention generally comprises high-mounted truck tail lights for signalling braking and turning of a truck to drivers located beyond other vehicles positioned immediately behind the truck. The inventive device includes a left signal light and a right signal light mounted to the lateral pillars or rear doors of a truck trailer body. The signal lights are positioned proximal to an upper transverse pillar of the truck trailer body so as to be viewable over a car or other vehicle positioned immediately behind the trailer body.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new high-mounted truck tail lights apparatus and method which has many of the advantages of the tail light signaling devices mentioned heretofore and many novel features that result in high-mounted truck tail lights which is not anticipated, rendered obvious, suggested, or even implied by any of the prior art tool guides, either alone or in any combination thereof.

It is another object of the present invention to provide new high-mounted truck tail lights which may be easily and efficiently manufactured and marketed.

It is a further object of the present invention to provide new high-mounted truck tail lights which is of a durable and reliable construction.

An even further object of the present invention is to provide new high-mounted truck tail lights which is susceptible of a low cost of manufacture with regard to both materials and labor, and which accordingly is then susceptible of low prices of sale to the consuming public, thereby making such high-mounted truck tail lights economically available to the buying public.

Still yet another object of the present invention is to provide new high-mounted truck tail lights which provides in the apparatuses and methods of the prior art some of the advantages thereof, while simultaneously overcoming some of the disadvantages normally associated therewith.

Still another object of the present invention is to provide new high-mounted truck tail lights for signalling braking and turning of a truck to drivers located beyond other vehicles positioned immediately behind the truck.

Yet another object of the present invention is to provide new high-mounted truck tail lights which includes a left signal light and a right signal light mounted to the lateral pillars or rear doors of a truck trailer body, with the signal lights being positioned proximal to an upper transverse pillar of the truck trailer body so as to be viewable over a car or other vehicle positioned immediately behind the trailer body.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a rear elevation view of the high-mounted truck tail lights according to the present invention.

FIG. 2 is a side elevational view of one of the high-mounted truck tail lights taken from line 2—2 of FIG. 1.

Similar reference characters refer to similar parts throughout the several views of the drawings.

DESCRIPTION OF PREFERRED EMBODIMENT

Figure 3:
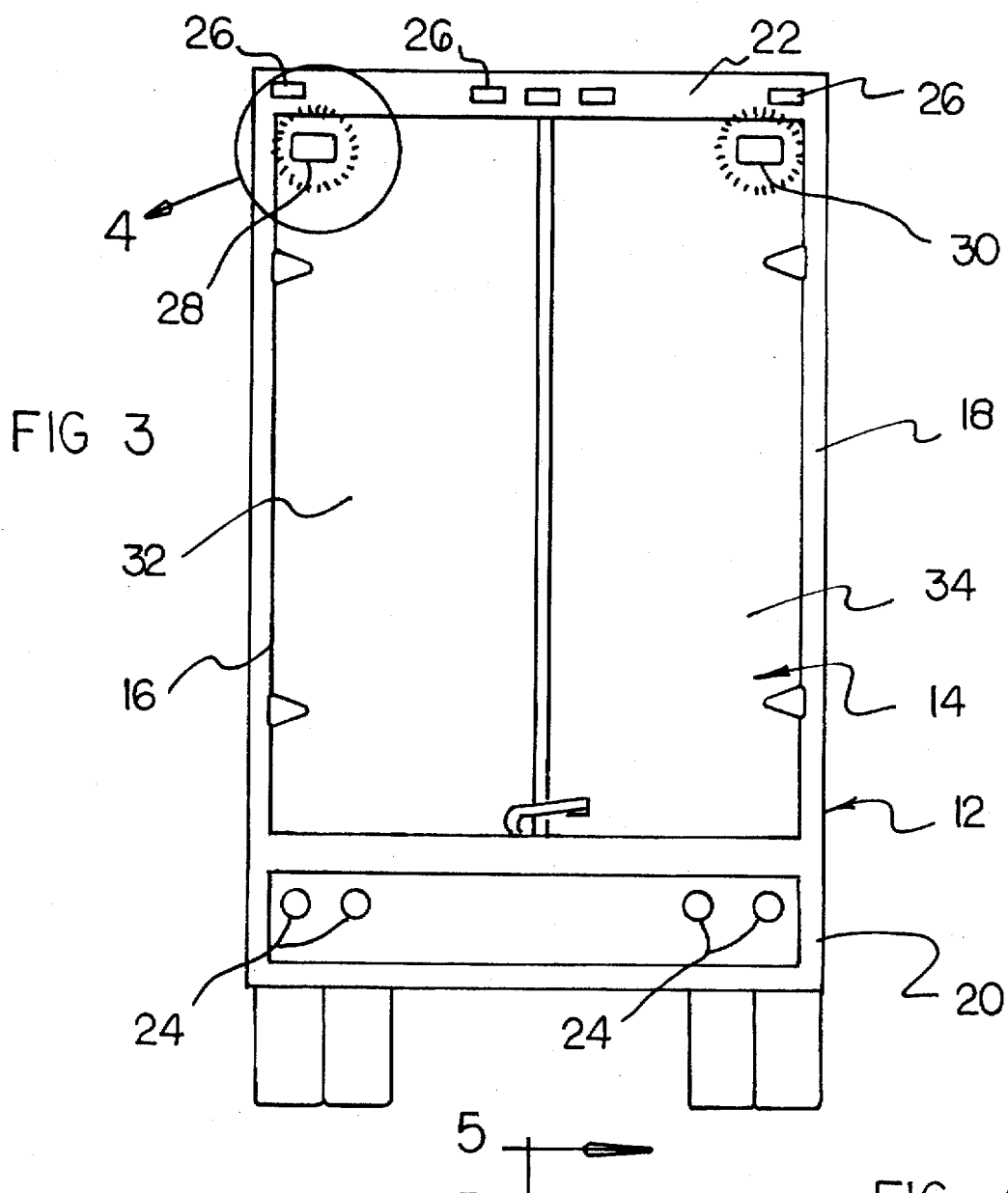
FIG. 3 is a rear elevation view of an alternative form of the high-mounted truck tail lights according to the present invention.

With reference now to the drawings, and in particular to FIGS. 1–6 thereof, new high-mounted truck tail lights embodying the principles and concepts of the present invention and generally designated by the reference numeral 10 will be described.

More specifically, it will be noted that the high-mounted truck tail lights 10 comprises a truck trailer body 12 having a rear door assembly 14 flanked by left and right vertical lateral pillars 16 and 18. A frame 20 extends beneath the door assembly 14 and between lower ends of the vertical lateral pillars 16 and 18. An upper transverse pillar 22 extends between upper ends of the vertical lateral pillars 16 and 18. Conventional existing tail lights 24 which indicate braking and turning are mounted to the frame 20 of the truck trailer body 12 beneath the door assembly thereof and cannot be seen beyond a single vehicle such as a car positioned immediately behind the truck trailer 12. Clearance lights 26 which illuminate only to display the upper and outer limits of the truck trailer body 12 are mounted to the upper transverse pillar 22 and do not serve to indicate turning or braking of the associated truck. To permit communication of turning and braking signals to drivers of vehicles located two or more cars behind the truck, left and right signal lights 28 and 30 are mounted to the respective lateral pillars 16 and 18 proximal to the transverse pillar 22 and distal from the frame 20 of the truck trailer body 12. The signal lights 28 and 30 are electrically interconnected with the existing tail lights 24 of the truck trailer body 12 and operate or function in a same or similar manner such as by blinking to indicate turning and by continuous illumination to indicate braking. By this structure, a driver of the truck can signal braking and turning actions to drivers which are not immediately behind the truck trailer body to reduce accidents resulting from non-viewable highway signals during lane changing procedures or the like.

Figure 4:
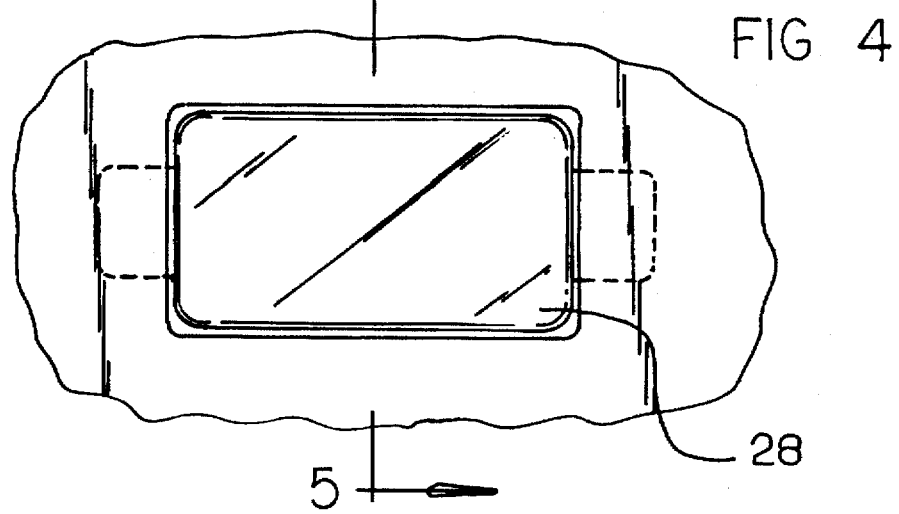
FIG. 4 is a rear elevational view of the area set forth in FIG. 3.
Figure 5:
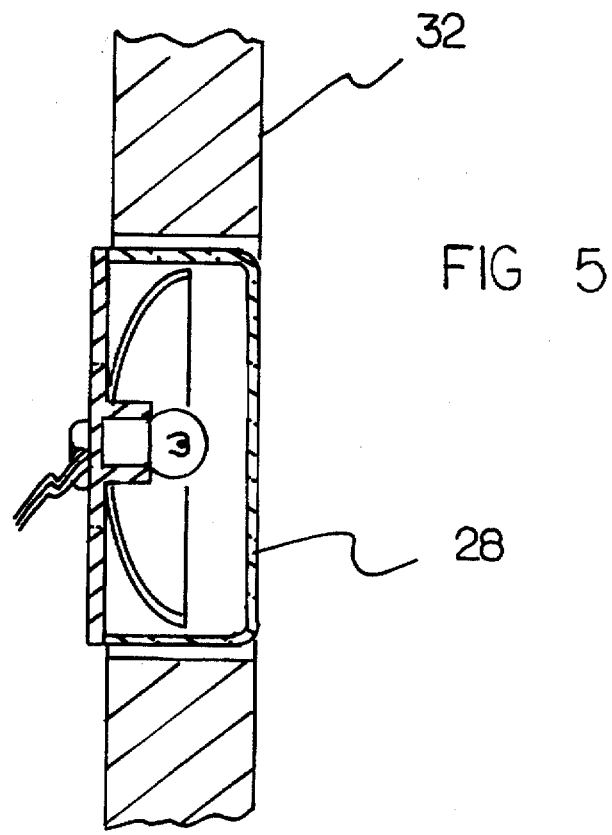
FIG. 5 is a cross sectional view taken along line 5—5 of FIG. 4.
Figure 6:
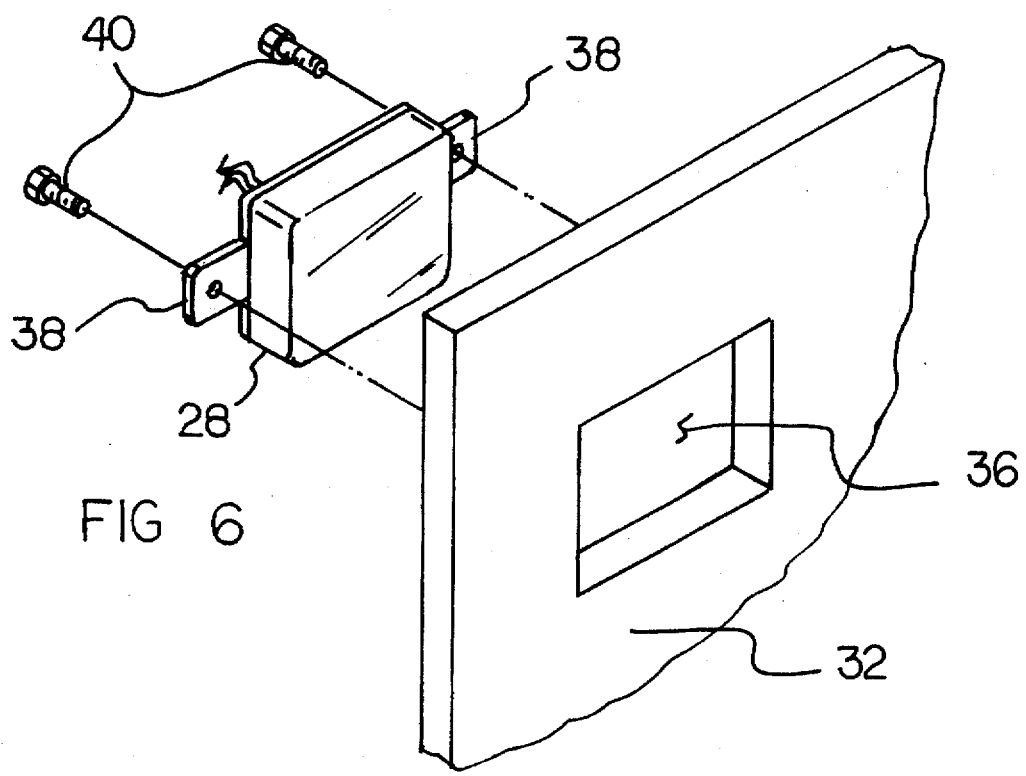
FIG. 6 is an exploded isometric illustration of the alternative form of the present invention.

As shown in FIGS. 1 and 2, the signal lights 28 and 30 can simply be mounted to the exterior of the lateral pillars of the truck trailer body 12. As shown in FIGS. 3 and 4, the signal lights 28 and 30 can be mounted to the left and right doors 32 and 34, respectively, when the truck trailer body 12 has a door assembly 14 in a barn-door configuration. In this embodiment of the invention 10, the signal lights 28 and 30 can be recessed within apertures 36 formed in the respective doors 32 and 34, as shown for the left signal light 28 within FIG. 4 for example. To this end and as shown in FIGS. 5 and 6, the signal lights 28 and 30 can include mounting tabs 38 extending therefrom which permit the direction of fasteners 40 therethrough for securement into the respective door 32 or 34.

In use, the high-mounted truck tail lights 10 according to the present invention can be easily utilized for signalling braking and turning of a truck to drivers located beyond other vehicles positioned immediately behind the truck. To this end, the high-mounted truck tail lights are positioned above the middle point of the lateral pillars and thus can be seen over a vehicle positioned immediately behind the truck trailer body 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. High-mounted truck tail lights comprising:
   a truck trailer body having a rear door assembly flanked by left and right vertical lateral pillars, a frame extending beneath the door assembly and between lower ends of the vertical lateral pillars, and an upper transverse pillar extending between upper ends of the vertical lateral pillars, the truck trailer body having existing tail lights which indicate braking and turning and are mounted to the frame of the truck trailer body beneath the door assembly thereof;

left and right signal lights mounted to the respective lateral pillars proximal to the transverse pillar and distal from the frame of the truck trailer body, the signal lights being electrically interconnected with the existing tail lights of the truck trailer body, whereby a driver of the truck trailer body can signal braking and turning actions to drivers which are not immediately behind the truck trailer body to reduce accidents resulting from non-viewable highway signals during lane changing procedures;

said lateral pillars each including a medial portion located medially between the upper and the lower ends of the vertical lateral pillars, and wherein the signal lights are positioned above the medial portion of the lateral pillars.

* * * * *